US010773353B2

(12) United States Patent
Suzuyama et al.

(10) Patent No.: US 10,773,353 B2
(45) Date of Patent: Sep. 15, 2020

(54) MANUFACTURING SYSTEM

(71) Applicant: FUJI MACHINE MFG. CO., LTD., Chiryu (JP)

(72) Inventors: Shigefumi Suzuyama, Toyota (JP); Kazuya Furukawa, Chiryu (JP); Kazuyoshi Nagato, Toyoake (JP); Shuichi Hirata, Toyota (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 180 days.

(21) Appl. No.: 15/508,294

(22) PCT Filed: Sep. 5, 2014

(86) PCT No.: PCT/JP2014/073540
§ 371 (c)(1),
(2) Date: Mar. 2, 2017

(87) PCT Pub. No.: WO2016/035208
PCT Pub. Date: Mar. 10, 2016

(65) Prior Publication Data
US 2017/0274486 A1 Sep. 28, 2017

(51) Int. Cl.
*B23Q 37/00* (2006.01)
*B23Q 41/02* (2006.01)
(Continued)

(52) U.S. Cl.
CPC ............ *B23Q 37/007* (2013.01); *B23Q 7/10* (2013.01); *B23Q 7/1405* (2013.01); *B23Q 41/02* (2013.01);
(Continued)

(58) Field of Classification Search
CPC ..... Y10T 29/50; Y10T 29/5136; Y10T 29/52; Y10T 29/5124; B23Q 37/005;
(Continued)

(56) References Cited

U.S. PATENT DOCUMENTS 3,571,873 A * 3/1971 Muller ................... B21D 28/22
29/38 C
4,667,403 A * 5/1987 Edinger ............. G05B 19/4183
29/840
5,333,370 A * 8/1994 Suzuki ............. G05B 19/41815
29/563

(Continued)

FOREIGN PATENT DOCUMENTS

JP 6-50752 U 7/1994
JP 6-293412 A 10/1994
(Continued)

OTHER PUBLICATIONS

International Search Report dated Dec. 9, 2014 in PCT/JP2014/073540 filed Sep. 5, 2014.

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A manufacturing system includes a base and multiple work machine modules that are attachable and detachable to and from the base arranged in the arrangement direction on the base or on the side of the base, in which the plurality of work machine modules include one or more processing work modules that perform machine processing work on a workpiece using a tool, and one or more supplementary work modules that perform supplementary work that is work supplementarily performed to the machine processing work. Since it is possible to easily increase and decrease the number of processing work modules and supplementary work modules or sort the modules, it is possible to easily recombine the modules with respect to modification of the manufacturing process.

16 Claims, 15 Drawing Sheets

(51) Int. Cl.
  *B23Q 17/20* (2006.01)
  *B23Q 7/10* (2006.01)
  *B23Q 7/14* (2006.01)
  *B23Q 1/58* (2006.01)
  *B23Q 17/24* (2006.01)

(52) U.S. Cl.
  CPC ............ *B23Q 1/58* (2013.01); *B23Q 17/2471* (2013.01); *Y10T 29/50* (2015.01); *Y10T 29/5124* (2015.01)

(58) Field of Classification Search
  CPC .......... le;.4qB23Q 37/007; B23Q 7/10; B23Q 7/103; B23Q 7/106; B23Q 7/14–1494; B23Q 41/02
  USPC .................................. 29/560, 564, 650, 563
  See application file for complete search history.

(56) References Cited

U.S. PATENT DOCUMENTS

| | | | | |
|---|---|---|---|---|
| 5,657,529 A | * | 8/1997 | Bohn | ........................ B41F 17/02 29/563 |
| 5,704,262 A | * | 1/1998 | Baumbusch | .............. B23B 3/30 82/124 |
| 5,836,064 A | * | 11/1998 | Winkler | ................... B23Q 7/05 29/33 P |
| 6,028,532 A | | 2/2000 | Tsurumoto et al. | |
| 6,217,265 B1 | * | 4/2001 | Katayama | ............. B23Q 1/015 100/349 |
| 6,405,483 B1 | * | 6/2002 | Tamada | ................. B23Q 11/08 49/142 |
| 6,920,973 B2 | * | 7/2005 | Koren | ................... B23P 21/004 198/339.1 |
| 7,112,017 B2 | * | 9/2006 | Killer | ........................ B23C 3/18 29/889.7 |
| 7,261,500 B2 | * | 8/2007 | Killer | ........................ B23C 3/18 29/889.7 |
| 7,555,823 B2 | * | 7/2009 | Arai | .................... B23Q 1/0054 29/563 |
| 8,474,117 B2 | * | 7/2013 | Kuriya | ..................... B23Q 7/10 211/184 |
| 2006/0104751 A1 | | 5/2006 | Arai | |
| 2007/0271756 A1 | * | 11/2007 | Aoki | ................... B65G 49/062 29/281.5 |
| 2014/0013591 A1 | * | 1/2014 | Lee | ......................... B23P 23/00 29/650 |

FOREIGN PATENT DOCUMENTS

| | | |
|---|---|---|
| JP | 2006-68894 A | 3/2006 |
| JP | 2010-018361 A * | 1/2010 |
| JP | 2011-77334 A | 4/2011 |
| WO | WO 91/13819 A1 | 9/1991 |

* cited by examiner (a)

W1

(b)

W2

(c)

W3

(d)

P (a)

(b)

(a)

(b)

MANUFACTURING SYSTEM

TECHNICAL FIELD

The present application relates to a manufacturing system in which multiple work machines are disposed.

BACKGROUND ART

A system such as described in the patent literature below is considered as a manufacturing system which is constituted such that work machines including a machine tool are disposed in one line and multiple work machines sequentially perform work on one workpiece. In the system, multiple machine tools in which one machine main body section is mounted on one base are lined up, and each machine main body is able to be pulled out from each base. Therefore, the system is highly convenient for maintenance, replacement, and the like of the machine main body section.

CITATION LIST

Patent Literature

PTL 1: JP-A-2006-68894

SUMMARY

It is possible to increase practicality of the system by improving the manufacturing system in which the multiple work machines including machine tools as described above are disposed. The present invention is carried out from the above viewpoint and has the object of providing a manufacturing system with high practicality.

In order to solve the problem, the manufacturing system of the present disclosure is a manufacturing system including a base, and multiple work machine modules that are arranged in an arrangement direction on the base or on the side of the base and attachable and detachable to and from the base, in which the plurality of work machine modules include one or more processing work modules that perform machine processing work on a workpiece using a tool, and one of more supplementary work modules that perform supplementary work that is work supplementarily performed to the machine processing work.

Effects

The manufacturing system of the present disclosure does not only modularize at least one machine tool that performs processing work on the workpiece, but modularizes at least one machine that performs work supplementarily to the processing work, for example, supplementary work such as charging the workpiece into the manufacturing system, inspecting or verifying the workpiece prior to processing, during processing, or after processing is complete, temporary placing of the workpiece, and the like. According to the manufacturing system of the present disclosure, since it is possible to easily increase and decrease the number of processing work modules and supplementary work modules or sort the modules, it is possible to easily recombine the modules with respect to modification of the manufacturing process.

DESCRIPTION OF EMBODIMENTS

Figure 1:
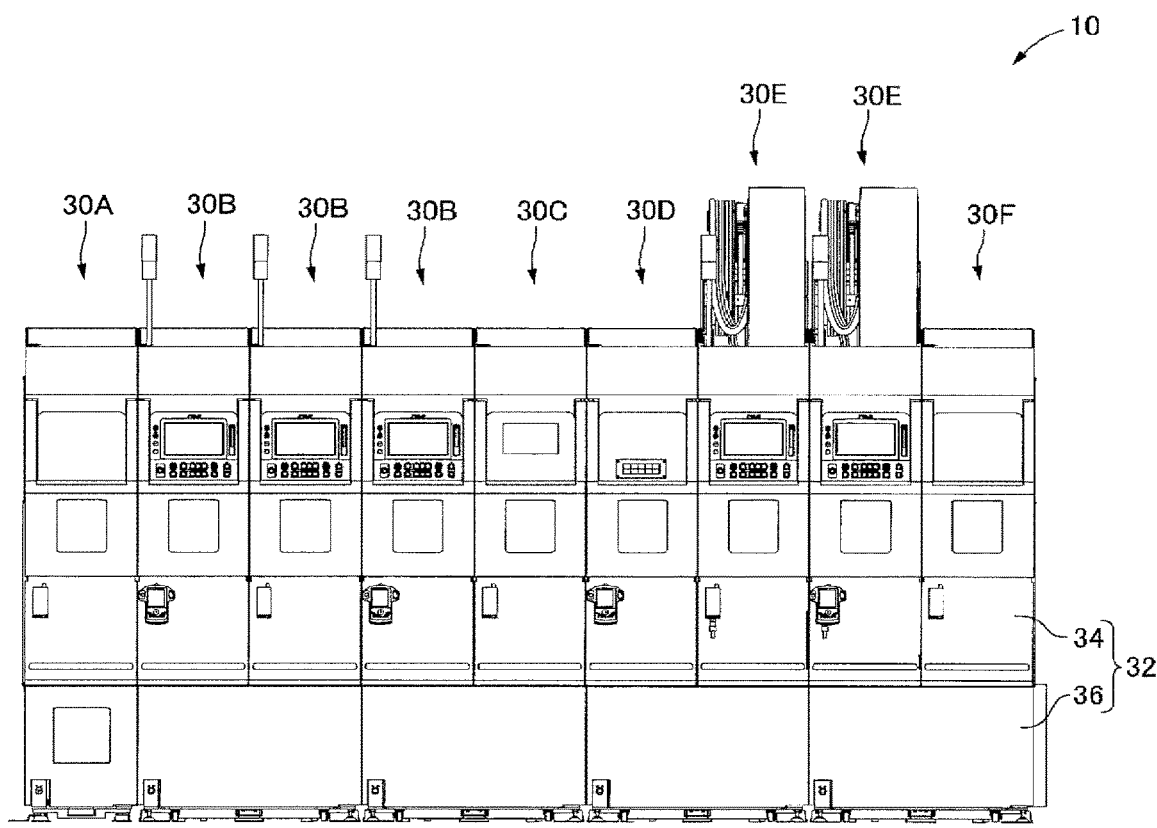
FIG. 1 is a front view of a manufacturing system that is an embodiment of the present disclosure.
Figure 2:
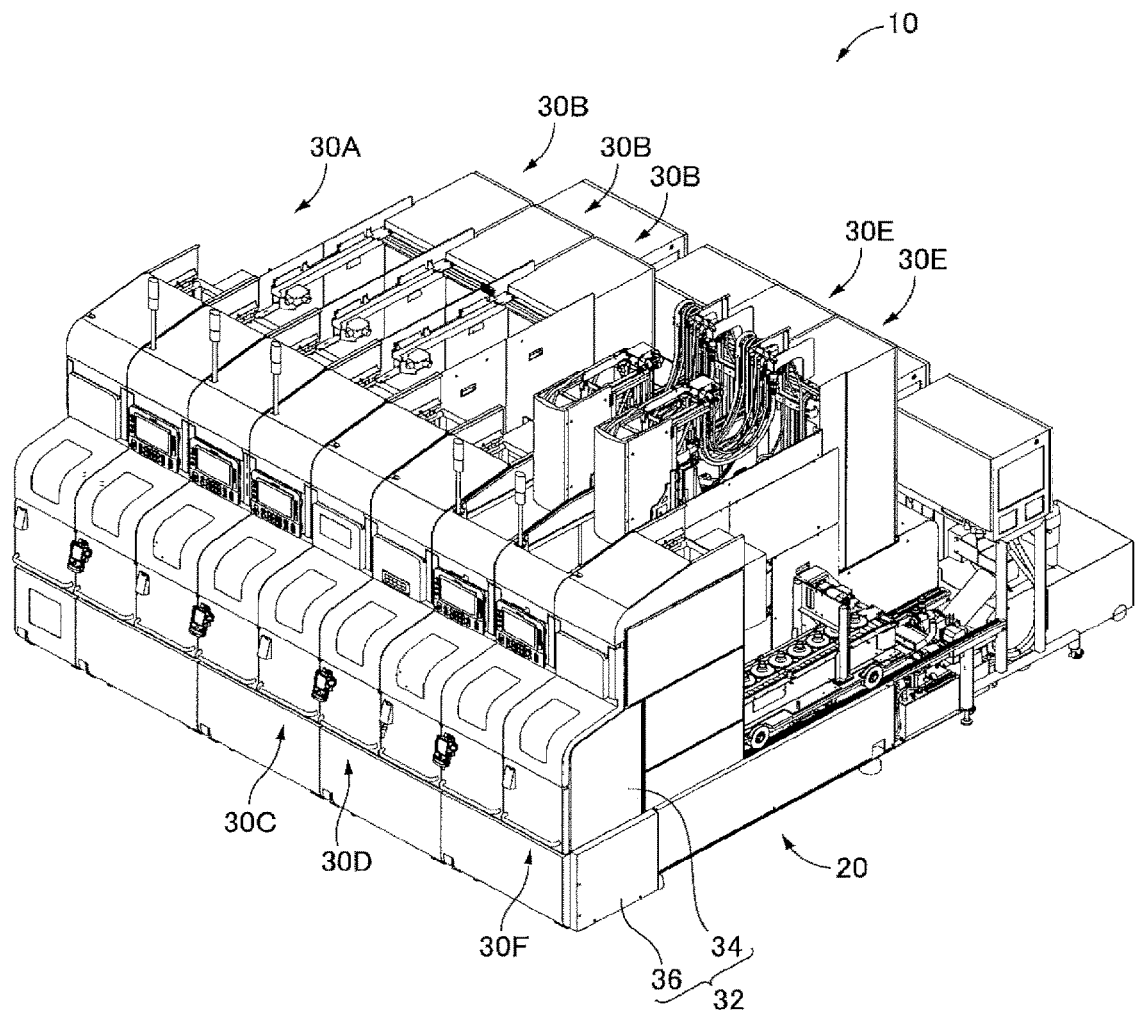
FIG. 2 is a perspective view illustrating the manufacturing system indicated in FIG. 1 in a viewpoint from the right front.

An example of a manufacturing system that is an embodiment of the present disclosure will be described below with reference to the drawings. Note that, in addition to the embodiments below, the present disclosure is able to be implemented in a state in which various modifications are carried out based on knowledge of a person skilled in the art.
Overall Configuration of Manufacturing System As shown in FIGS. 1 and 2, a manufacturing system 10 that is an embodiment of the present disclosure is provided with a base 20 and nine work machine modules 30 arranged on the base 20. One side face side of the manufacturing system 10 of the present embodiment indicated in FIG. 1 is covered by an exterior panel 32. Note that, the exterior panel 32 is configured to include an upper panel 34 and a lower panel 36, the upper panel 34 is provided corresponding to each of the nine work machine modules 30, and each work machine module 30 is modularized to include the upper panel 34. In the description below, one side face side that is covered by the exterior panel 32 is referred to as a front face side, "front and rear", "left and right", and "up and down" in relation to the system 10 function as front and rear, left and right, and up and down viewed from the front face side of the system 10. That is, a left-right direction in which the nine work machine modules 30 are arranged is an arrangement direction, and a front-back direction is an intersecting direction that is a direction that intersects with (is orthogonal to) the arrangement direction.

Eight of the nine work machine modules 30 (eight from the right side in FIG. 1) are mounted on the base 20, the remaining one (leftmost in FIG. 1) is disposed next to the base 20, and the nine work machine modules 30 are arranged in one line. As understood from FIGS. 1 and 2, the nine work machine modules 30 have equal dimensions in the arrangement direction and are arranged to be close to each other. Note that, the nine work machine modules 30 include six types of work machine modules 30A, 30B, 30C, 30D, 30E, and 30F described in detail later, and the upper panel 34 corresponding to each of the various types of work machine modules 30 have approximately equal form, dimensions, and structure as each other. Accordingly, the manufacturing system 10 has a sense of unity in appearance.

In addition, dimensions of various types of work machine modules 30 in the left-right direction are equivalently small to dimensions in the front-back direction. Then, the dimension of the base 20 in the left-right direction is approximately equal to the dimensions of the eight work machine modules 30 in the left-right direction in a state in which the eight work machine modules 30 are mounted. That is, in the left-right direction, on the base 20, the eight work machine modules 30 have a size to be precisely placed. From such a configuration above, the manufacturing system 10 has a length of the entirety of the system 10 in the arrangement direction that is comparatively short regardless of the arrangement of the nine work machine modules 30.

Figure 3:
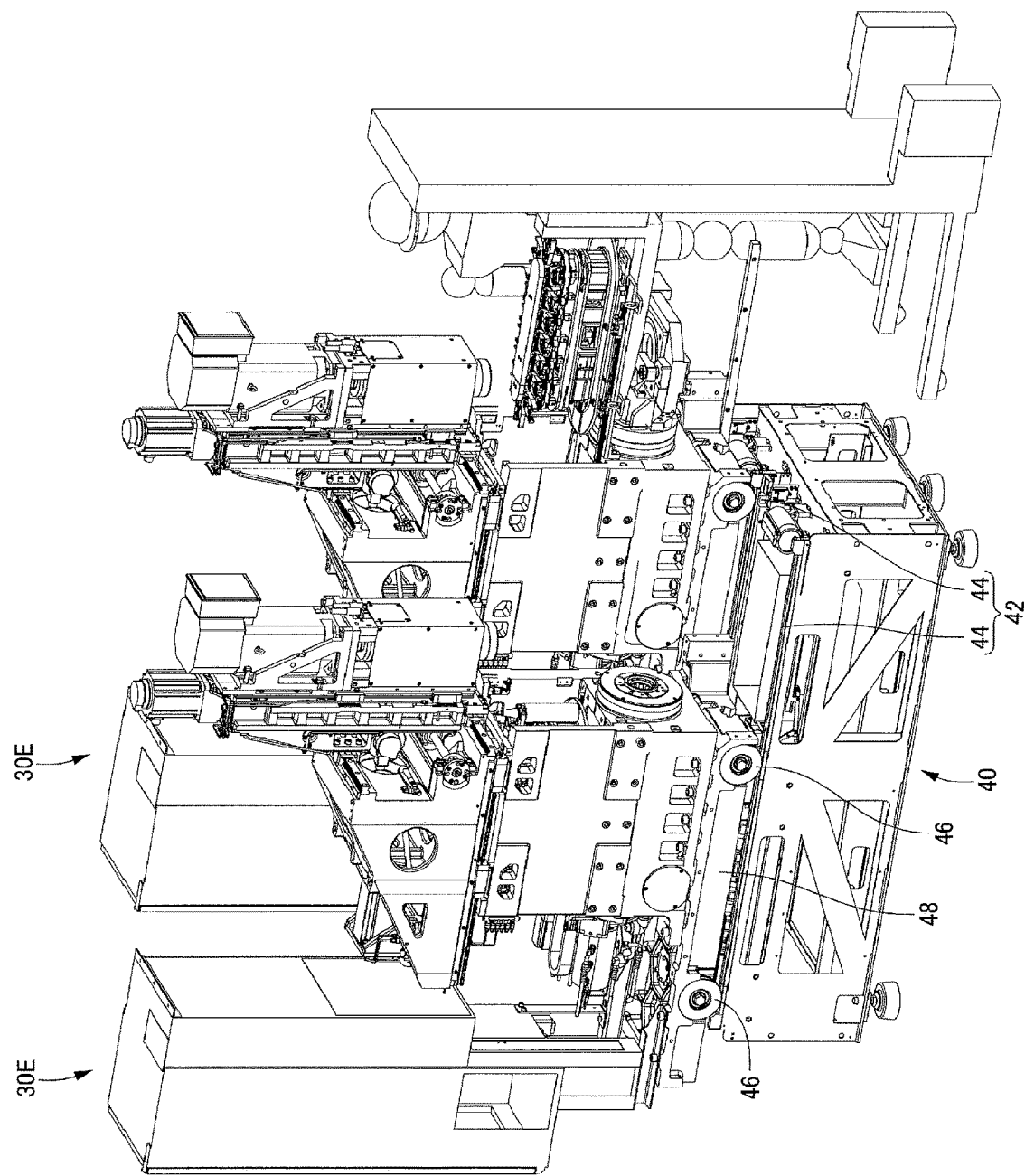
FIG. 3 is a perspective view illustrating a circumstance in which a work machine module indicated in FIG. 1 is pulled out from the front on a base.
Figure 4:
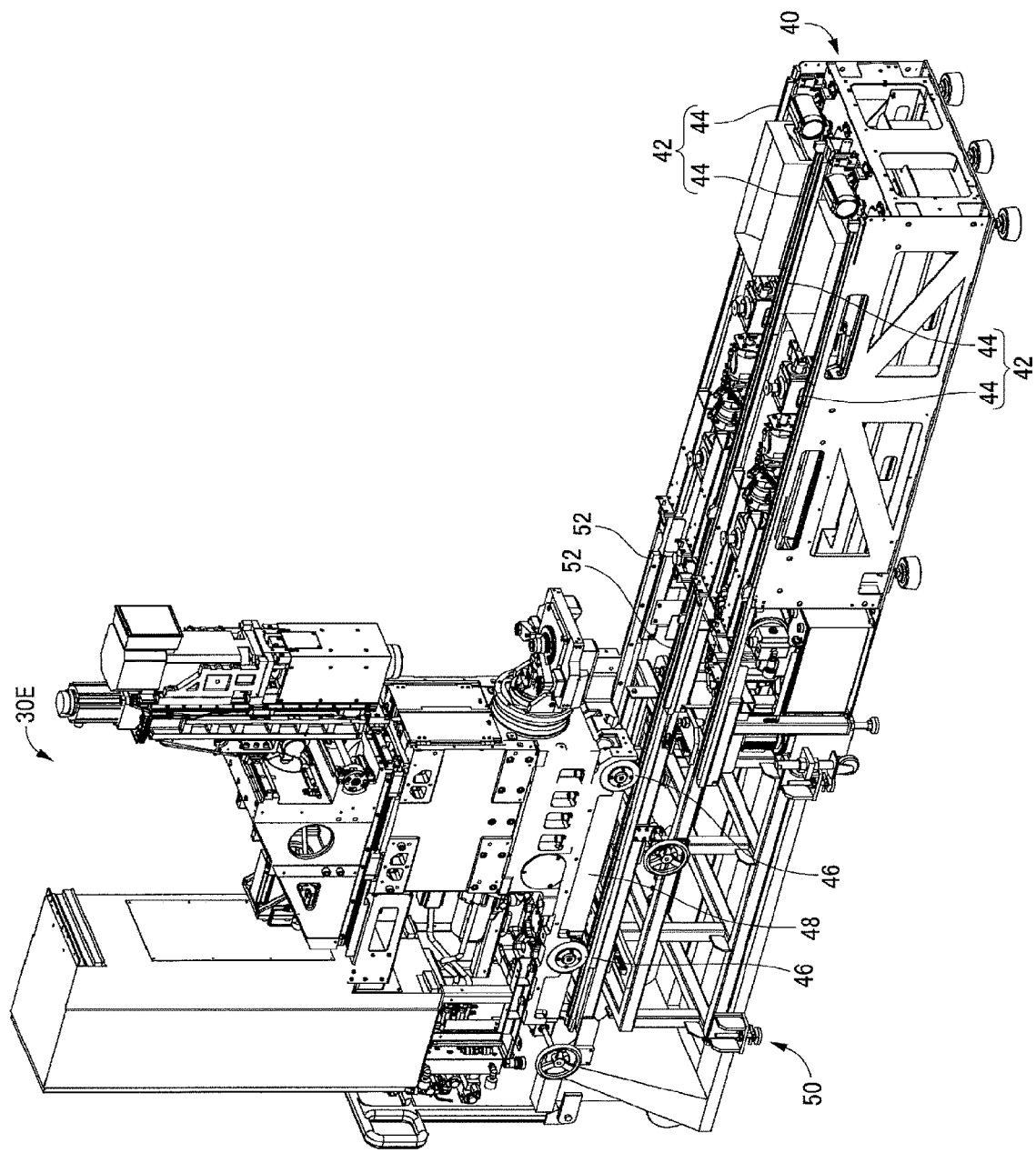
FIG. 4 is a perspective view illustrating a circumstance in which a work machine module indicated in FIG. 1 is pulled out from the rear from the base.

On the base 20, four base units 40 indicated in FIGS. 3 and 4 are lined up and fixed to each other. Each of the four base units 40 are able to mount two work machine modules 30 thereon. The four base units 40 are each standardized, and have the same form, dimensions, and structure as each other. Note that, in the manufacturing system 10, the base 20 is constituted by four base units, but there may be a system in which eight work machine modules 30 are arranged to be mounted on one base as a single object.

As shown in FIG. 4, a rail pair 42 of a number according to the number of the modules that are mounted on each base unit 40, and in detail, two rail pairs 42 are provided and lined up in the arrangement direction. The one rail pair 42 is formed of one pair of rails 44 that is laid so as to extend in the intersecting direction (front-back direction) in a gap. The rail 44 defines a raceway on which the module 30 moves when pulling out the work machine module 30. Meanwhile, one pair of wheels 46 on each of the front and rear is held in each module 30, that is, two pairs of wheels 46 are held on a bed 48 rotatably. Note that, the bed 48 and the two pairs of wheels 46 of the five types that are mounted on the base 20 out of the six types of work machine modules 30 are standardized and have the same form, dimensions, and structure as each other, and a machine main body that is provided on the bed 48 is different. Then, the work machine modules 30 are able to be easily pulled out from the base unit 40 at both sides in the intersecting direction, in detail, the front side and the rear side by the two pairs of wheels 46 rolling one pair of rails 44. That is, the work machine module 30 on the right side in FIG. 3 is pulled out to the front in the intersecting direction.

Put another way, the work machine module 30 is able to be pulled out from the base unit 40 to be detachable. A state in which the pulling out of the module 30 is performed from the rear using a wheeled table 50 is indicated in FIG. 4. The wheeled table 50 has one pair rails 52 with the same gap in the same cross sectional state as the one pair of rails 44 that is provided in the base unit 40, and is set with respect to the base 20 such that the one pair of rails 52 extend the one pair of rails 44. In this state, some or all of the work machine modules 30 are able to be moved on the wheeled table 50. Note that, in FIGS. 3 and 4, only one type of work machine module 30 is represented, but as described above, in the five types of work machine modules 30 that are mounted on the base 20, the bed 48 and the two pairs of wheels 46 are standardized, and therefore the work machine modules 30 are able to be pulled out from the base unit 40 either to the front side or the rear side.

Figure 5:
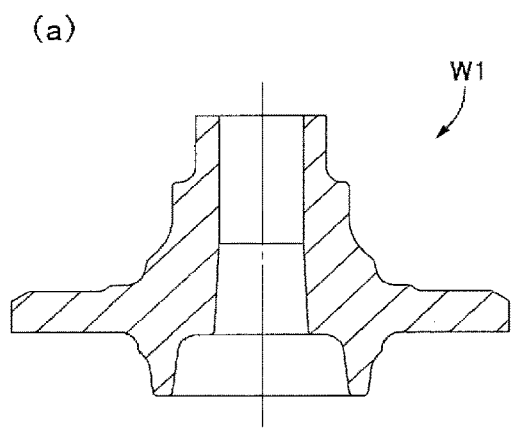
FIG. 5 shows sectional views illustrating a processing process of a product that is manufactured in the system indicated in FIG. 1.
Figure 5:
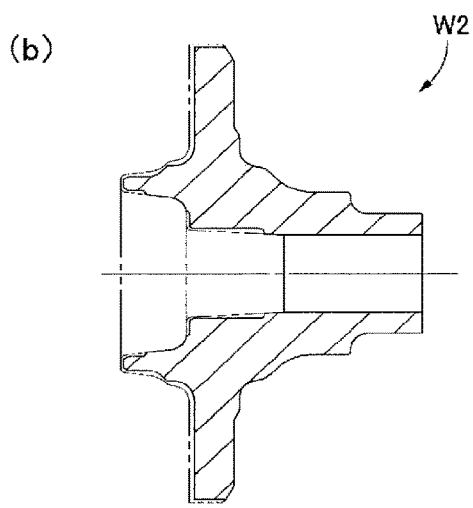
Figure 5:
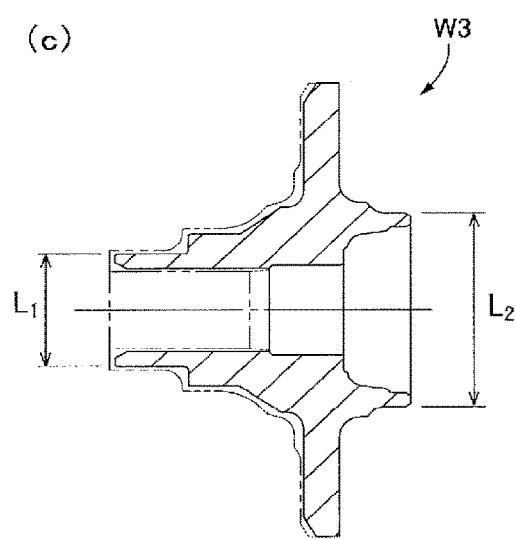
Figure 5:
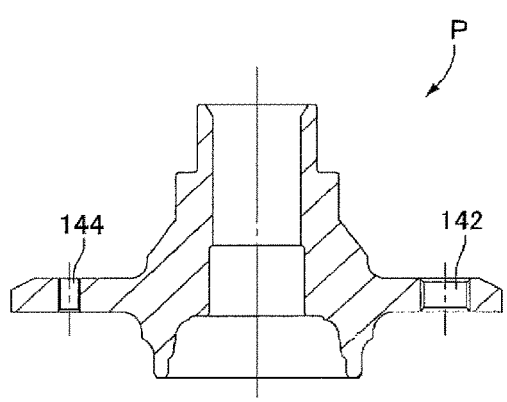
Figure 6:
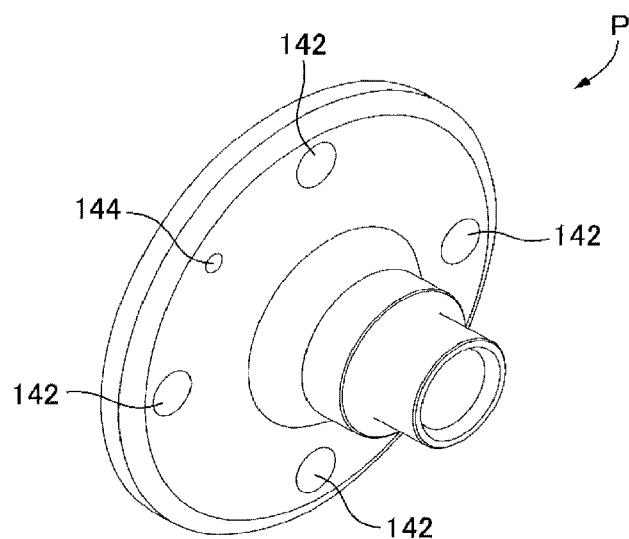
FIG. 6 shows perspective views of the product that is manufactured in the system indicated in FIG. 1.
Figure 6:
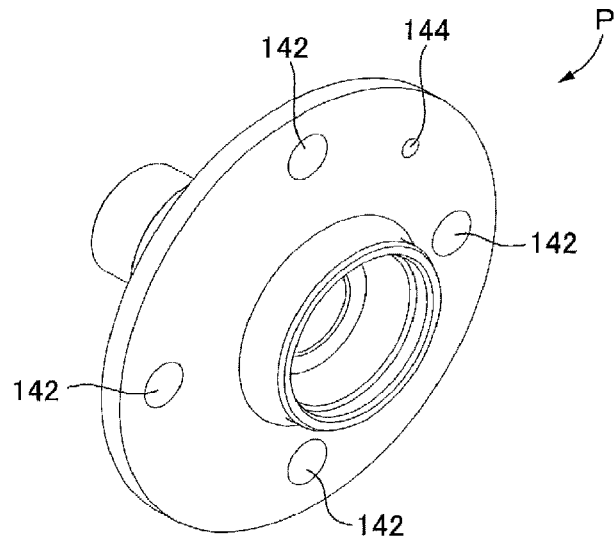

The manufacturing system 10 manufactures a product P indicated in FIG. 6 by performing machine processing work using various tools on a workpiece W1 that is indicated in FIG. 5A. That is, in the manufacturing system 10, five out of the nine work machine modules 30 are processing work modules that perform machine processing work on the workpiece. In detail, the manufacturing system 10 is provided with three lathe modules 30B in which a lathe is modularized and two drilling-milling modules 30E in which a machining center which performs drilling using a drill, milling processing and the like are modularized, as processing work modules.

Meanwhile, the remaining four out of the nine work machine modules 30 are supplementary work modules that perform supplementary work that is work supplementarily performed to the machine processing work which is performed by the processing work modules. In detail, the manufacturing system 10 is provided with one each of the workpiece charging module 30A that charges the workpiece W1 in the system 10, the verification module 30C that verifies the workpiece during processing, the temporary placement module 30D for temporarily placing the workpiece in the middle of the system 10, and the stock module 30F that stores the completed product P as the supplementary work modules.

In the manufacturing system 10, the workpiece charging module 30A is arranged so as to contact the side face of the left face of the base 10, the three modules of the lathe module 30B, the verification module 30C, and the temporary placement module 30D and the two modules of the drilling-milling module 30E and the stock module 30F are arranged on the base 10 in order from the left side. Then, in the manufacturing system 10, the workpiece that is charged by the workpiece charging module 30A is produced such that work is performed by each work machine module 30 in order from the left side work machine module 30.

Figure 7:
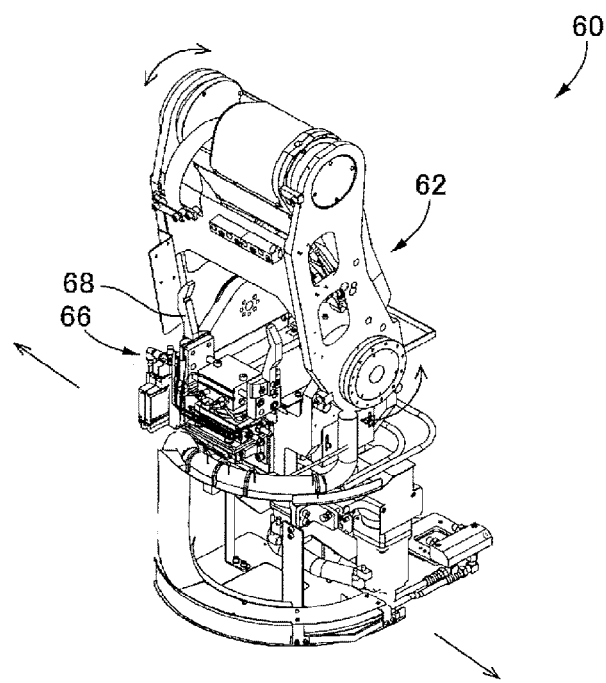
FIG. 7 shows perspective views of a workpiece transfer device provided in the system indicated in FIG. 1.
Figure 7:
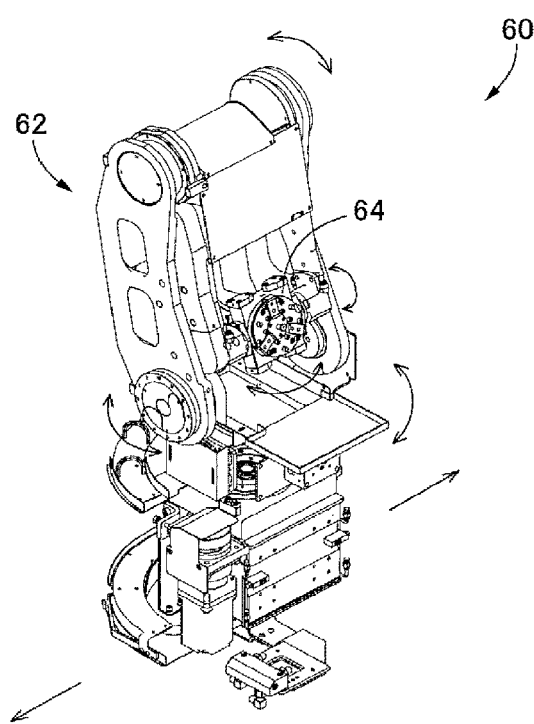

Note that, the manufacturing system 10 is provided with two workpiece loaders 60 indicated in FIG. 7 as a workpiece transfer device that transfers the workpiece in the arrangement direction. The two workpiece loaders 60 are movable in the arrangement direction along a rail that is provided on a side face of the front side in the intersecting direction of the base 20 and are able to transfer the workpiece across the multiple work machine modules 30. That is, illustration is omitted, but the workpiece loaders 60 are able to move in the arrangement direction in a space that is formed using the base 20 and the exterior panel 32.

In addition, each of the two workpiece loaders 60 has an articulated type arm 62 and a chuck 64 serving as a holding tool that is provided on a distal end of the arm 62 and holds the workpiece. That is, the workpiece loaders 60 stretch the arm 62 to a working position of the work machine module 30, the workpiece is mounted at the working position by the chuck 64, and the workpiece is able to be separated from the working position.

Furthermore, the workpiece loader 60 has a workpiece inversion device 66. The workpiece inversion device 66 grasps the workpiece using a clamp 68, and the workpiece is inverted by rotating the clamp 68 by 180° around an axis extending in an up-down direction. Note that, in a case where the workpiece loader 60 is to change an orientation of the workpiece that is held with the chuck 64 by 180° in the up-down direction, the workpiece loader 60 moves the workpiece held with the chuck 64 by the arm 62 to a position at which a clamp 68 can grasp the workpiece, the workpiece is grasped by the clamp 68, and the workpiece that is inverted by the workpiece inversion device 66 is held again using the chuck 64.

One workpiece loader 60 is movable from the second work machine module 30 from the left side to the fifth work machine module 30 from the left side, receives the workpiece from the workpiece charging module 30A, delivers the workpiece to three lathe modules 30B and the verification module 30C, hands over the workpiece to the temporary placement module 30D, and the like. In addition, the other workpiece loader 60 is movable from the seventh work machine module 30 from the left side to the work machine module 30 on the right end, receives the workpiece from the temporary placement module 30D, delivers the workpiece in the drilling-milling module 30E, hands over the workpiece to the stock module 30F, and the like.

Product Manufacturing Process and Work Machine Module Configuration (A) Workpiece Charging (Workpiece Charging Module)

Figure 8:
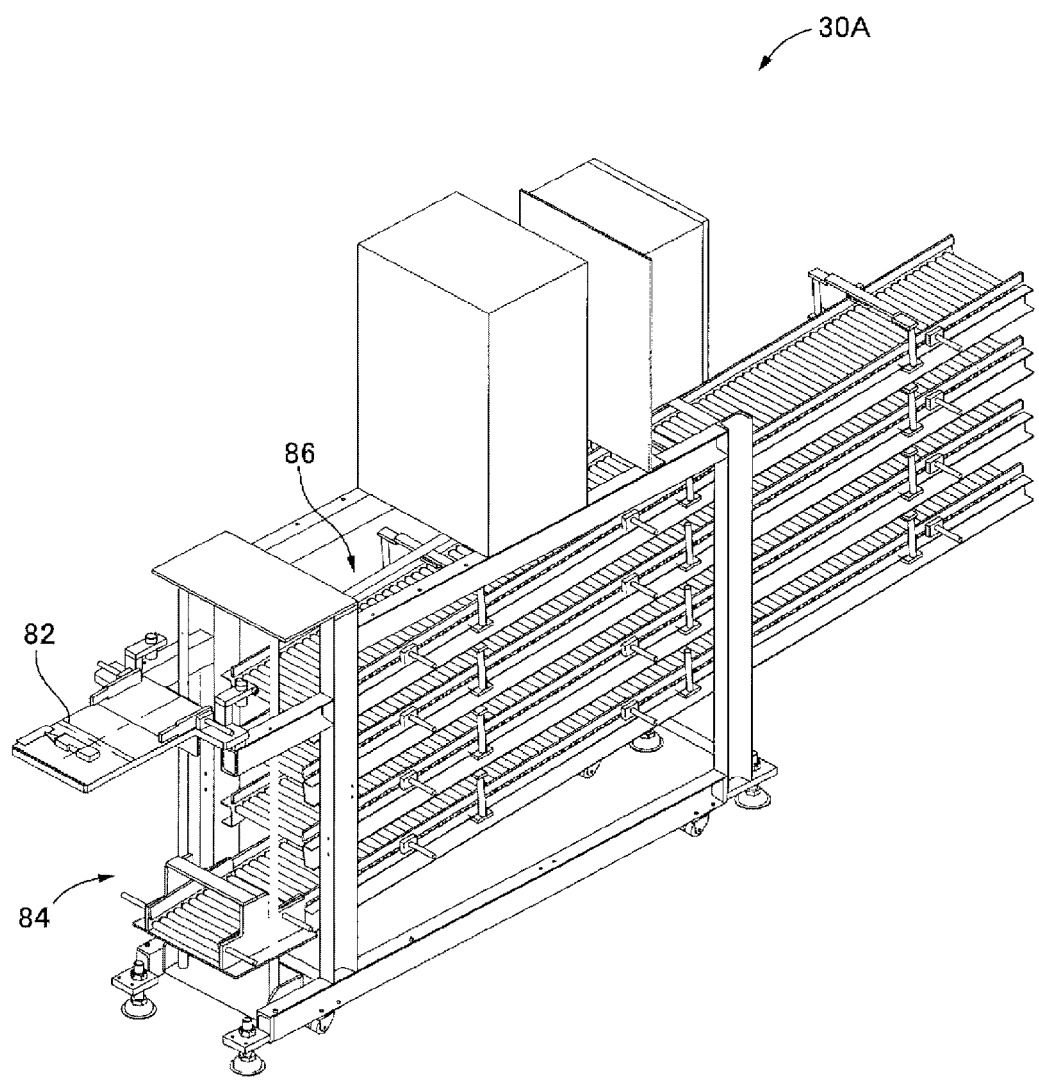
FIG. 8 is a perspective view of a workpiece charging module provided in the system indicated in FIG. 1.

Next, the manufacturing process of the product P using the manufacturing system 10 is described in order while describing the configuration of each work machine module 30. In the manufacturing system 10, first, the workpiece W1 is charged by the workpiece charging module 30A. As shown in FIG. 8 (indication of upper panel 34 and the like are omitted), the workpiece charging module 30A has four stages such that a workpiece pool 80 that extends in the intersecting direction is overlapped in the up-down direction and is able to accommodate multiple workpieces W1. The workpiece charging module 30A is provided with a charging table 82 that serves as a position at which the workpiece W1 is received in the workpiece loader 60 at the upper side at the front end in the intersecting direction, that is, a charging position. In the workpiece charging module 30A, a lift 84 that is provided in front of the workpiece pool 80 receives the workpiece W1 one at a time from the workpiece pool 80 and conveys to the height of the charging table 82. Then, the workpiece W1 on the lift 84 is pushed out to above the charging table 82 by a cylinder device 86 and is positioned at the charging position.

(B) Cutting Processing (Lathe Module)

Figure 9:
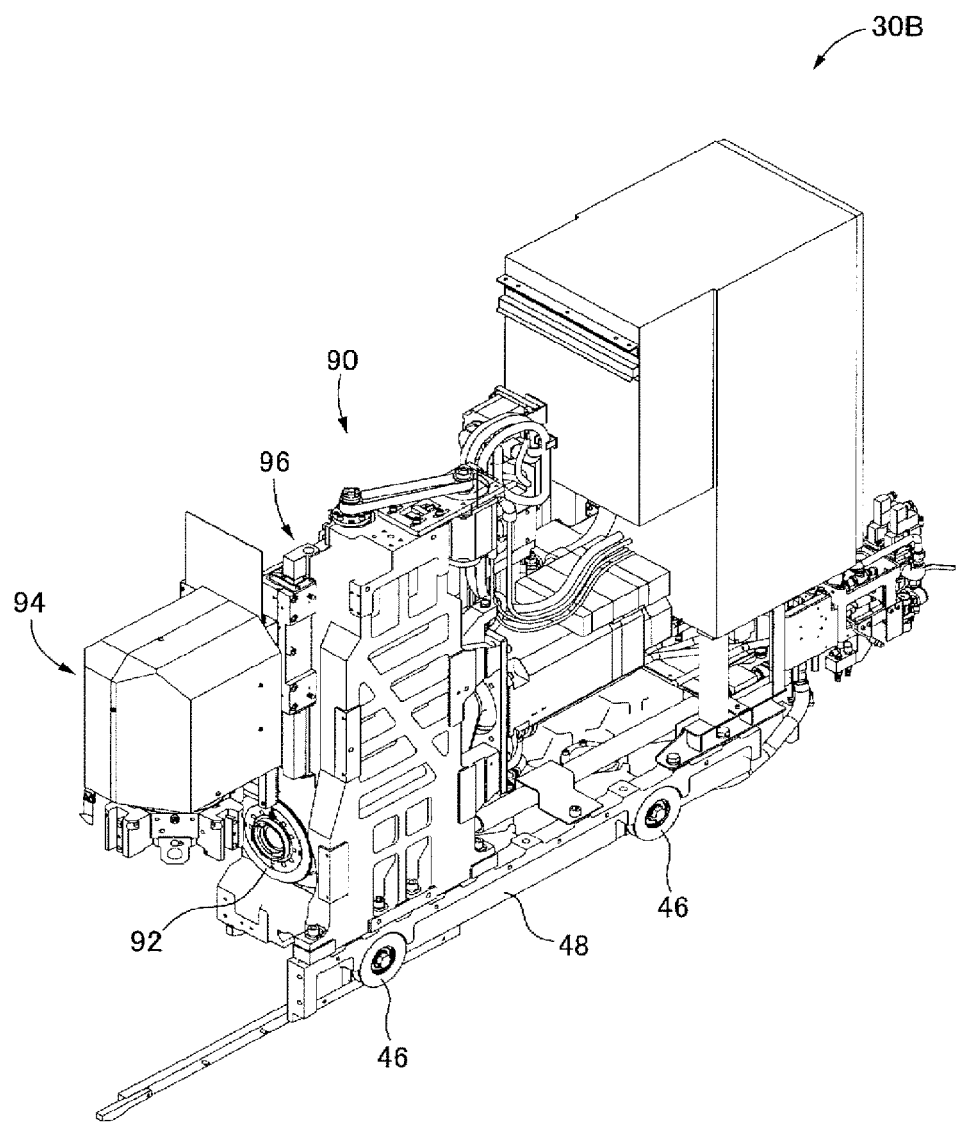
FIG. 9 is a perspective view of a lathe module provided in the system indicated in FIG. 1.

In the manufacturing system 10, first, cutting processing is performed on the charged workpiece W1 by the three lathe modules 30B. In each lathe module 30B, a lathe is modularized, and as shown in FIG. 9, a lathe main body 90 is fixed on the bed 48 that holds two pairs of wheels 46 described above to be rotatable. The lathe main body 90 is configured to include a spindle 92 for rotating the workpiece by rotation of the lathe main body 90, a tool holding head 94 that holds multiple cutting tools that are respective tools, and a head moving device 96 that moves the tool holding head 94 up and down and front and back.

Each lathe module 30B holds the workpiece using the chuck that is provided on the distal end of the spindle 92, cutting processing is performed by the cutting tool that is held on the head 94 while the workpiece is rotated. Note that, the first lathe module 30B cuts places on a two-dot chain line indicated in FIG. 5B, and the second and third lathe modules 30B cut places on a two-dot chain line indicated in FIG. 5C. Note that, the cutting processes of workpieces from W2 to W3 need a longtime in comparison to the cutting process from W1 to W2, therefore the second lathe module 30B and the third lathe module 30B perform completely the same work, and the workpiece W2 that is subjected to cutting processing by the first lathe module 30B is alternately transferred to the second lathe module 30B and the third lathe module 30B.

(C) Workpiece Verification (Verification Module)

Figure 10:
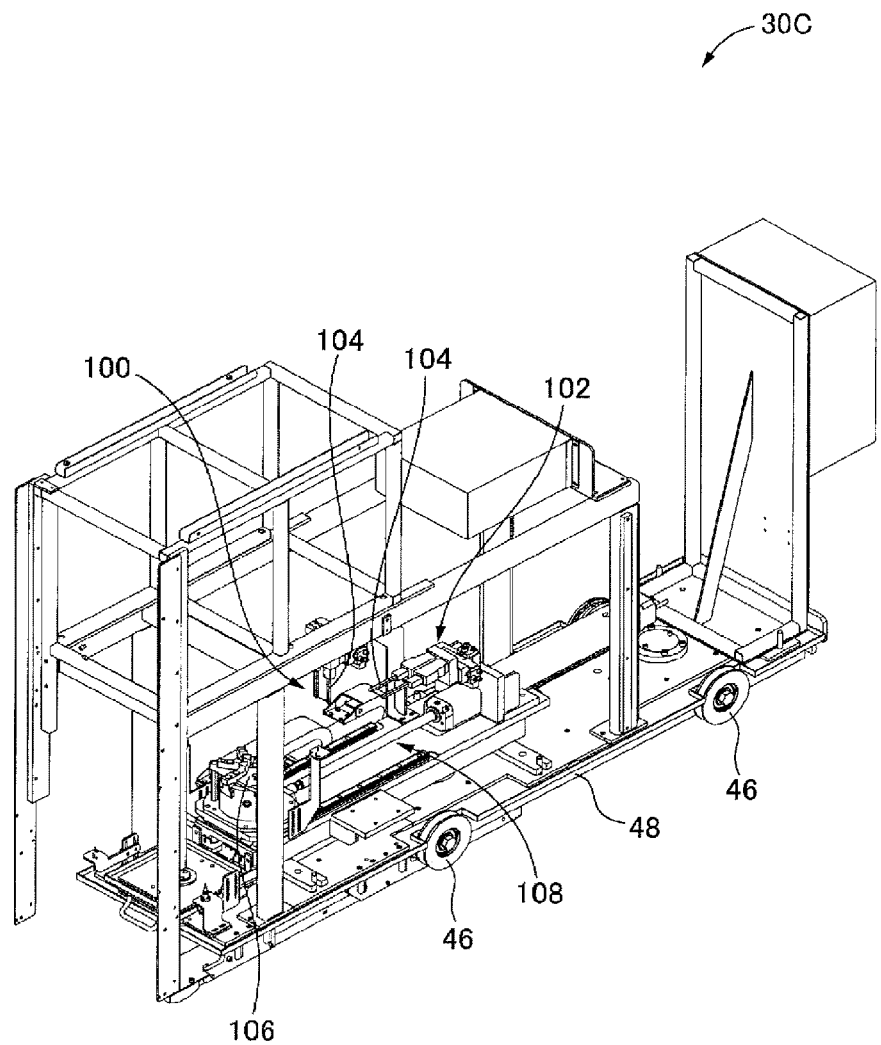
FIG. 10 is a perspective view of a verification module provided in the system indicated in FIG. 1.

The workpiece W3 that is processed by three lathe modules 30B is transferred to the verification module 30C by the workpiece loader 60. The verification module 30C verifies all of the workpiece W3 that is processed by the three lathe modules 30B. The verification module 30C sets a verification position to two places lined up in the intersecting direction using a deep depth (dimension in the intersecting direction is long). Then, as shown in FIG. 10, the verification module 30C is provided with a first verification instrument 100 and a second verification instrument 102 at the respective verification positions at two places. Each of the two verification instruments 100 and 102 has one pair of jaws 104 that are movable in the arrangement direction and the arrangement direction and a part of the workpiece W3 is interposed by the one pair of jaws 104, and the dimensions of the part of the workpiece W3 are verified based on a gap between the one pair of jaws 104 at that time.

In addition, the verification module 30C has a workpiece moving device 108 that moves the workpiece W3 which is held in the chuck 106 in the intersecting direction. First, the verification module 30C moves the workpiece W3 to the verification position at which the first verification instrument 100 is provided and verifies the dimension $L_1$ on one end side of the workpiece W3 (refer to FIG. 5C) using the workpiece moving device 108, next, the workpiece W3 is moved to the verification position at which the second verification instrument 102 is provided and verifies the dimension $L_2$ on the other end side of the workpiece W3. Then, the verification module 30C issues a warning in a case where a difference from a designed value is large.

Note that, two verification positions are set in the verification module 30C of the manufacturing system 10, but it is possible to increase the number of the verification positions to three or more. In addition, the verification module 30C of the manufacturing system 10 is configured such that verification is performed by one verification instrument at one verification position, but may be configured such that verification is performed by multiple verification instruments at one verification position.

(D) Workpiece Temporary Placement (Temporary Placement Module)

Figure 11:
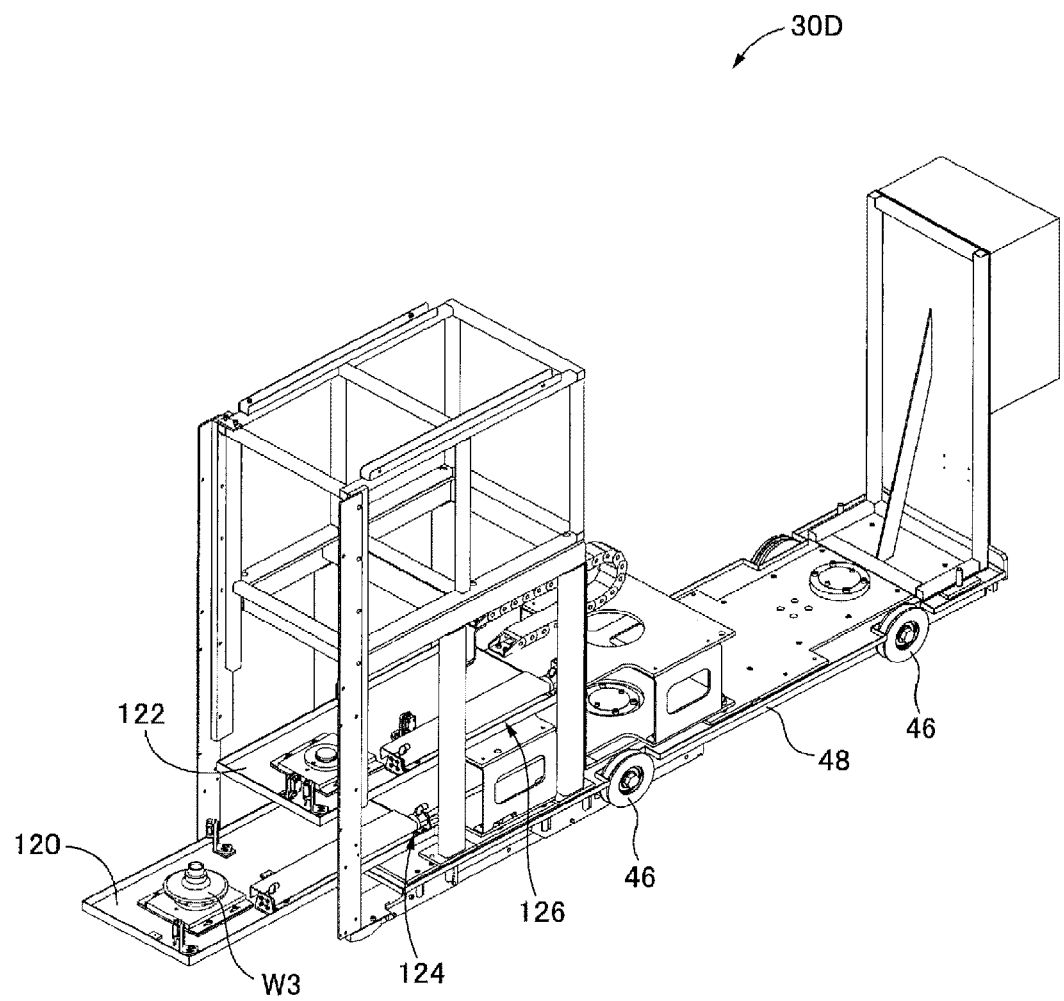
FIG. 11 is a perspective view of a temporary placement module provided in the system indicated in FIG. 1.

Next, the workpiece W3 with which no problem is found in verification in the verification module 30C is transferred to the temporary placement module 30D. As shown in FIG. 11, the temporary placement module 30D is provided with two temporary placement tables 120 and 122 on which the workpiece W3 is mounted are lined up in the up-down direction. Each of the temporary placement tables 120 and 122 are configured so as to move in the intersecting direction by two table moving devices 124 and 126 that are provided to correspond to the temporary placement tables 120 and 122, and are in a state of protruding from the base 20, or in a state retreated on the base 20.

Ordinarily, as shown in FIG. 11, the lower stage temporary placement table 120 is in a state of being protruded from the base 20, the upper stage temporary placement table 122 is in a state of being retreated on the base 20, and the workpiece W3 is received between the two workpiece loaders 60 using the lower stage temporary placement table 120. Note that, in a case where an operator and the like takes a product and the like of the workpiece W3 directly by hand to check, in response to an instruction from outside, the upper stage temporary placement table 122 is in a state of being protruded from the base 20 and it is possible to mount the workpiece W3 on the upper stage temporary placement table 122. It is possible to open and close the upper panel 34 in the up-down direction, and it is possible to easily take out the workpiece W3 that is mounted on the upper stage temporary placement table 122 by opening the upper panel 34.

Note that, the temporary placement module 30D of the manufacturing system 10 has two temporary placement tables that are able to respectively mount one workpiece, but it is possible to mount multiple workpieces on one temporary placement table by increasing the number of temporary placement tables to three or more, and it is possible to set a module that is able to accommodate multiple workpieces by being able to mount more workpieces.

(E) Drilling Processing (Drilling-Milling Module)

Figure 12:
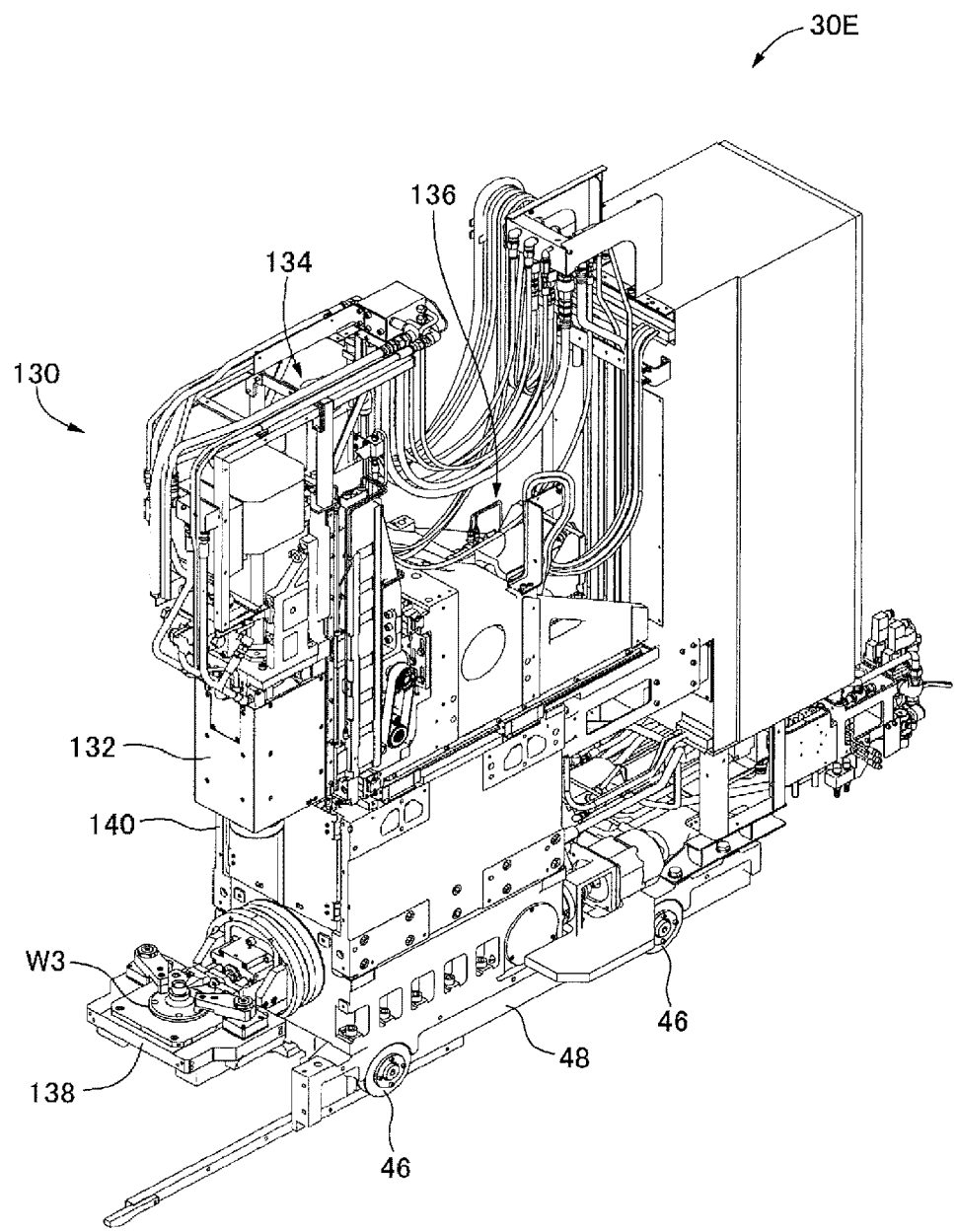
FIG. 12 is a perspective view of a drilling-milling module provided in the system indicated in FIG. 1.

Next, drilling processing is performed on the workpiece W3 by two drilling-milling modules 30E. In each drilling-milling module 30E, a machining center is modularized, and as shown in FIG. 12, a machining center main body 130 is fixed on the bed 48 that holds two pairs of wheels 46 described above to be rotatable. The machining center main body 130 is configured to include a main spindle head 132 that holds a tool such as a drill in a lower end portion, a head lifting and lowering device 134 that moves the main spindle head 132 in the up-down direction, a head moving device 136 that moves the main spindle head 132 along a horizontal plane by moving the main spindle head 132 in two directions that are orthogonal to each other, a workpiece table 138 that holds the workpiece W3, and a tool magazine that is accommodated inside.

Each drilling-milling module 30E moves the main spindle head 132 to a drilling position with respect to the workpiece that is fixed and held in the workpiece table 138, the main spindle head 132 is lowered while rotating a spindle 140 to which a drill is attached, and two types of holes 142 and 144 indicated in FIG. 6 are opened. Then, processing such as chamfering a hole is performed while replacing a tool that is held in the main spindle head 132 with another tool that is accommodated in the tool magazine, and completes the product P. Note that, the drilling processing to the workpiece needs a longtime in comparison to a work time of another work machine module 30, therefore the two drilling-milling modules 30E perform completely the same work, and the workpiece loaders 60 alternately transfer the workpiece W3 that is received from the temporary placement module 30D to the two drilling-milling modules 30E.

That is, in the manufacturing system 10, the drilling-milling module 30E performs only drilling processing, but the drilling-milling module 30E modularizes the machining center, and therefore the drilling-milling module 30E can be used for various processing such as rotary cutting working or milling processing.

(F) Accommodation at Carry-Out Side (Stock Module)

Figure 13:
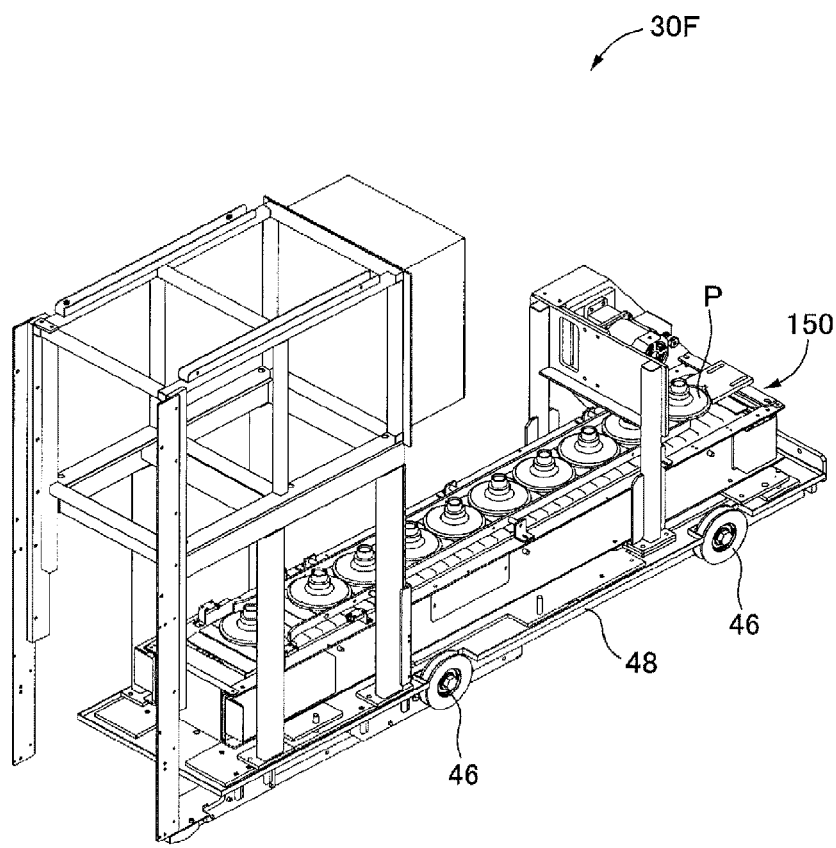
FIG. 13 is a perspective view of a stock module provided in the system indicated in FIG. 1.

The product P that is completed as one type of workpiece is accommodated in the stock module 30F. As shown in FIG. 13, the stock module 30F has a conveyor 150 that extends in the intersecting direction, and the mounted product P is moved behind only one product using the conveyor 150 by mounting the product P using the workpiece loaders 60. That is, the stock module 30F is able to accommodate multiple products P on the conveyor 150 in a state of being lined up. That is, it is possible to carry out the product P of the conveyor 150 from the tail end in the intersecting direction. Note that, the stock module 30F is able to be used as a module to temporarily place the workpiece in the middle of the manufacturing system.

Features of Manufacturing System

The manufacturing system 10 is configured such that each of the work modules 30 have dimensions in the arrangement direction that are short in comparison to the dimensions in the intersecting direction, and work is performed using a space in the intersecting direction, and the length in the arrangement direction is short by each of the work modules 30 being arranged close without a gap. In addition, in the manufacturing system 10, not only a machine that performs machine processing work is modularized, but also the machine that performs supplementary work that is supplementarily performed to the machine processing work is modularized, therefore it is possible to easily construct a system that manufactures various products merely by rearranging the processing work module and the supplementary work module.

Figure 14:
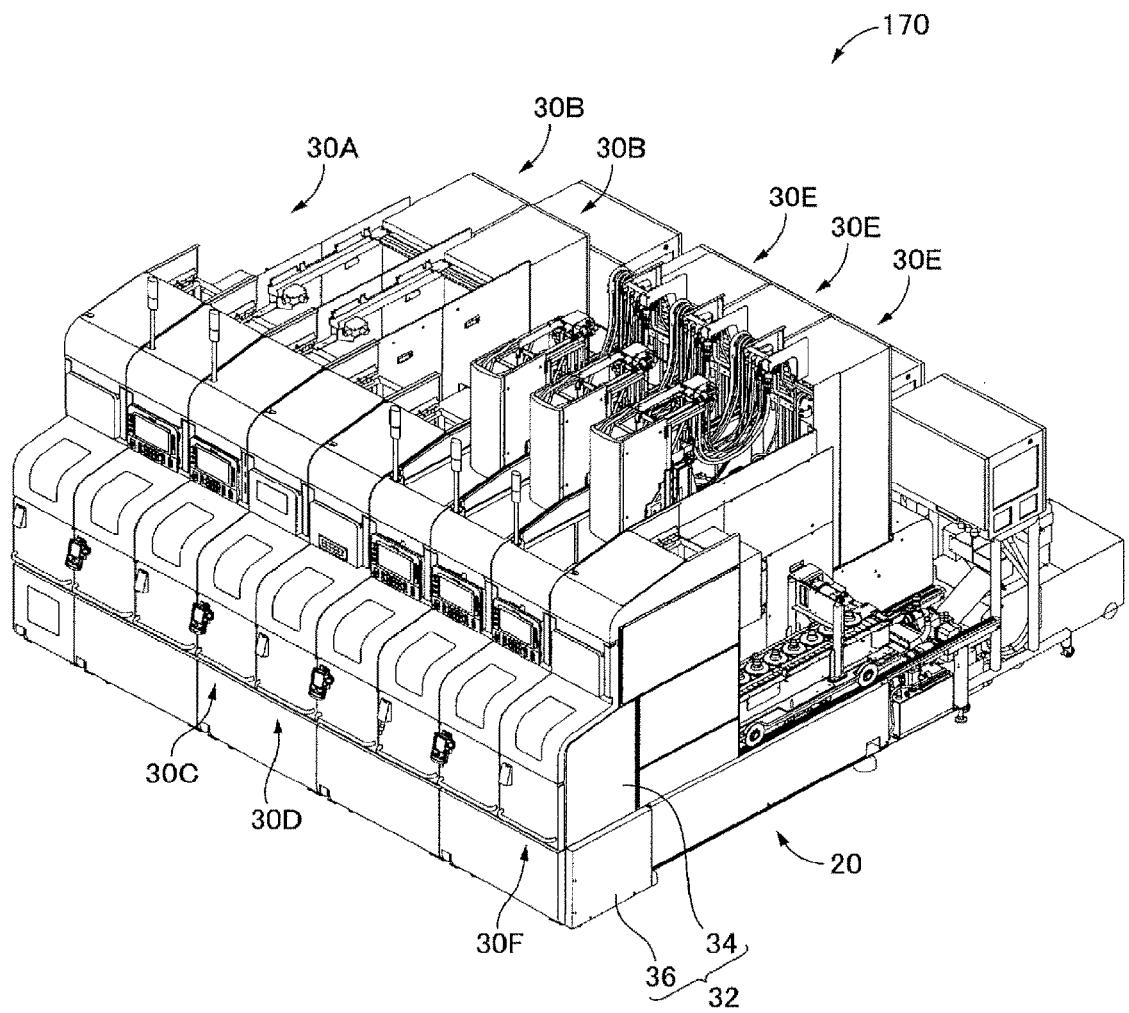
FIG. 14 is a perspective view illustrating a manufacturing system of an alternative embodiment.

For example, in a case of manufacturing a product on which milling processing or drilling processing are greatly carried out in comparison to the product P that is manufactured by the manufacturing system 10 described above, it is possible to set a manufacturing system 170 as indicated in FIG. 14. In the manufacturing system 170, the workpiece charging module 30A, the two lathe modules 30B, the verification module 30C, the temporary placement module 30D, the three drilling-milling modules 30E, and the stock module 30F are arranged in order from the upstream side (left side).

Figure 15:
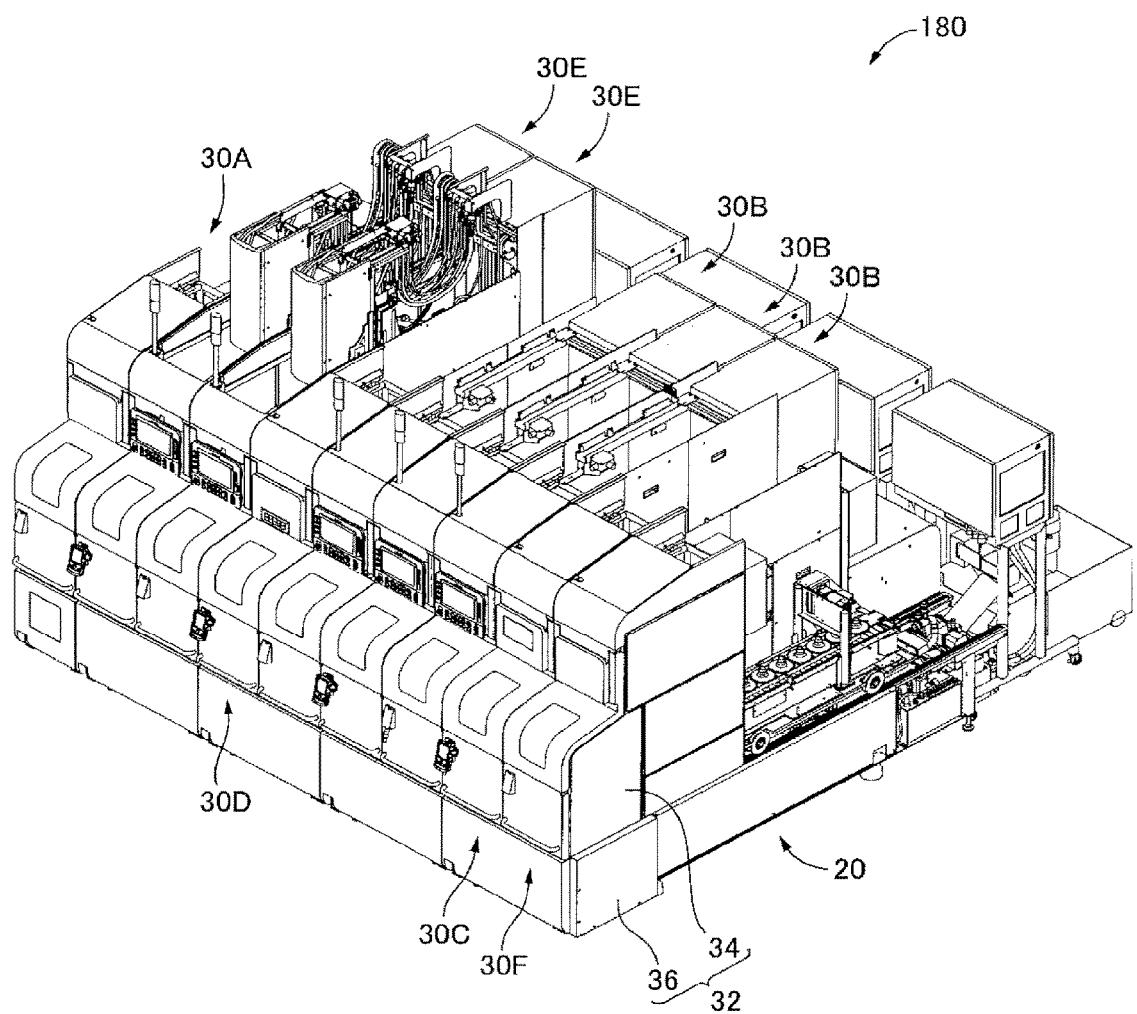
FIG. 15 is a perspective view illustrating a manufacturing system of another alternative embodiment.

In addition, for example, in a case where rotary cutting processing, milling processing, and drilling processing are performed in advance, and the cutting processing is performed by holding the workpiece using a hole opened by the drilling processing as a reference, it is possible to set a manufacturing system 180 as indicated in FIG. 15. In the manufacturing system 180, the workpiece charging module 30A, the two drilling-milling modules 30E, the temporary placement module 30D, the three lathe modules 30B, the verification module 30C, and the stock module 30F are arranged in order from the upstream side.

REFERENCE SIGNS LIST

10: MANUFACTURING SYSTEM, 20: BASE, 30: WORK MACHINE MODULE, 30A: WORKPIECE CHARGING MODULE (SUPPLEMENTARY WORK MODULE), 30B: LATHE MODULE (PROCESSING WORK MODULE), 30C: VERIFICATION MODULE (SUPPLEMENTARY WORK MODULE), 30D: TEMPORARY PLACEMENT MODULE (SUPPLEMENTARY WORK MODULE), 30E: DRILLING-MILLING MODULE (PROCESSING WORK MODULE), 30F: STOCK MODULE (SUPPLEMENTARY WORK MODULE), 40: BASE UNIT, 42: RAIL PAIR, 44: RAIL, 46: WHEEL, 48: BED, 50: WHEELED TABLE, 60: WORKPIECE LOADER (WORKPIECE TRANSFER DEVICE), 66: WORKPIECE INVERSION DEVICE, 80: WORKPIECE POOL, 82: CHARGING TABLE (CHARGING POSITION), 100: FIRST VERIFICATION INSTRUMENT, 102: SECOND VERIFICATION INSTRUMENT, 108: WORKPIECE MOVING DEVICE, 120, 122: TEMPORARY PLACEMENT TABLE, 150: CONVEYOR, 170: MANUFACTURING SYSTEM, 180: MANUFACTURING SYSTEM

The invention claimed is:

1. A manufacturing system comprising:
a base;
multiple work machine modules that are arranged in an arrangement direction on a top face of the base and are attachable and detachable to and from the base; and
a first workpiece transfer device and a second workpiece transfer device that each move in the arrangement direction and are each slidably guided on a side face of the base, which side face is on an end side of the base and extends in an intersecting direction that is orthogonal with the arrangement direction,
wherein the multiple work machine modules include one or more processing work modules that perform machine processing work on a workpiece using a tool, and one or more supplementary work modules that perform supplementary work that is work supplementarily performed to the machine processing work,
wherein the one or more supplementary work modules include a temporary placement module that includes multiple tables arranged lined up in an up-down direction, each of the multiple tables being configured to move outward from the base in the intersecting direction,
wherein each of the multiple tables includes an area configured to mount the workpiece, and
wherein the first workpiece transfer device transfers the workpiece to the temporary placement module and the second workpiece transfer device takes the workpiece from the temporary placement module and transfers the workpiece further in the arrangement direction.

2. The manufacturing system according to claim 1,
wherein the first workpiece transfer device is configured to mount the workpiece at respective working positions of a first set of the multiple work machine modules upstream of the temporary placement module and to separate the workpiece from the first set of the multiple work machine modules.

3. The manufacturing system according to claim 2,
wherein the second workpiece transfer device is configured to mount the workpiece at respective working positions of a second set of the multiple work machine modules downstream of the temporary placement module and to separate the workpiece from the second set of the multiple work machine modules.

4. The manufacturing system according to claim 1,
wherein the one or more supplementary work modules include at least a workpiece charging module that supplies the workpiece into the manufacturing system.

5. The manufacturing system according to claim 4,
wherein the workpiece charging module is configured to accommodate multiple workpieces in a state of being lined up in the intersecting direction, and each of the multiple workpieces are positioned in order at a supply position provided at one end side in the intersecting direction.

6. The manufacturing system according to claim 4,
wherein the workpiece charging module is arranged at one end side of the base.

7. The manufacturing system according to claim 1,
wherein the one or more supplementary work modules include a verification module that verifies the workpiece at least prior to processing, during processing, or after processing is complete.

8. The manufacturing system according to claim 7,
wherein the verification module includes
a workpiece moving device that moves the workpiece in the intersecting direction, and
multiple verification instruments that verify the workpiece that is moved by the workpiece moving device up to positions respectively corresponding to multiple verification positions that are lined up in the intersecting direction.

9. The manufacturing system according to claim 1,
wherein the temporary placement module receives the workpiece from the first workpiece transfer device in a state in which each of the multiple tables are protruded from the base.

10. The manufacturing system according to claim 1,
wherein the one or more supplementary work modules at least have a conveyor that extends in the intersecting direction, and includes a stock module that is able to store multiple workpieces by mounting the multiple workpieces on the conveyor while moving by the conveyor.

11. The manufacturing system according to claim 1,
wherein two or more of the multiple work machine modules are arranged on the base.

12. The manufacturing system according to claim 1,
wherein at least one of the multiple work machine modules on the base is able to be pulled out in the intersecting direction that intersects with the arrangement direction.

13. The manufacturing system according to claim 12,
wherein at least one of the multiple work machine modules on the base is able to be pulled out in either of both directions that are opposite from each other in the intersecting direction.

14. The manufacturing system according to claim 1,
wherein the one or more processing work modules includes a second processing work module upstream of the temporary placement module.

15. The manufacturing system according to claim 1, further comprising:
an exterior panel that covers the side face of the base and respective side faces of each of the multiple work machine modules,
wherein the first workpiece transfer device and the second workpiece transfer device move in a space between the exterior panel and the base.

16. The manufacturing system according to claim 1,
wherein the arrangement direction is a left-right direction with regard to the base and the intersecting direction is a front-back direction with regard to the base.

* * * * *